(12) United States Patent
Lichtenhan et al.

(10) Patent No.: US 7,737,228 B2
(45) Date of Patent: *Jun. 15, 2010

(54) METALLIZED POLYHEDRAL OLIGOMERIC SILSESQUIOXANES AS CATALYSTS FOR POLYURETHANES

(75) Inventors: Joseph D. Lichtenhan, Petal, MS (US); Joseph J. Schwab, Huntington Beach, CA (US); Xuan Fu, Purvis, MS (US)

(73) Assignee: Hybrid Plastics, Inc., Hattiesburg, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/124,887

(22) Filed: May 21, 2008

(65) Prior Publication Data

US 2009/0082502 A1    Mar. 26, 2009

Related U.S. Application Data

(63) Continuation-in-part of application No. 11/015,185, filed on Dec. 17, 2004.

(60) Provisional application No. 60/931,310, filed on May 21, 2007, provisional application No. 60/531,458, filed on Dec. 18, 2003.

(51) Int. Cl.
    *C08F 283/04*    (2006.01)

(52) U.S. Cl. .................. 525/453; 525/474; 525/476; 525/479

(58) Field of Classification Search ............... 525/453, 525/474, 476, 479
    See application file for complete search history.

(56) References Cited

U.S. PATENT DOCUMENTS

| 5,194,928 | A  | * | 3/1993 | Cronin et al. ............... 257/629 |
| 6,716,919 | B2 |   | 4/2004 | Lichtenhan et al. |
| 2002/0052434 | A1 | * | 5/2002 | Lichtenhan et al. ......... 524/261 |
| 2002/0137625 | A1 | * | 9/2002 | Jost et al. .................... 502/158 |
| 2005/0192364 | A1 |   | 9/2005 | Lichtenhan et al. |

FOREIGN PATENT DOCUMENTS

| WO | WO 2007/040870 | * 12/2007 |
| WO | WO 2007/041344 | * 12/2007 |

OTHER PUBLICATIONS

International Search Report issued Jul. 30, 2008 in corresponding PCT/US2008/64371.

* cited by examiner

*Primary Examiner*—Bernard Lipman
(74) *Attorney, Agent, or Firm*—David H. Jaffer; Pillsbury Winthrop Shaw Pittman LLP

(57) ABSTRACT

A method of using metallized polyhedral oligomeric silsesquioxanes as cure promoters and catalysts for polyurethanes.

14 Claims, 6 Drawing Sheets

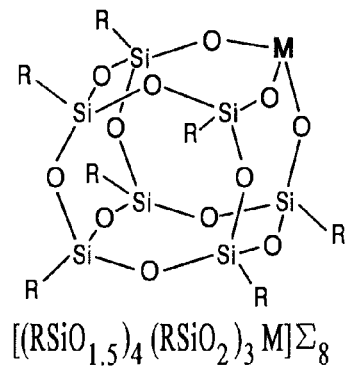
$[(RSiO_{1.5})_4 (RSiO_2)_3 M]\Sigma_8$
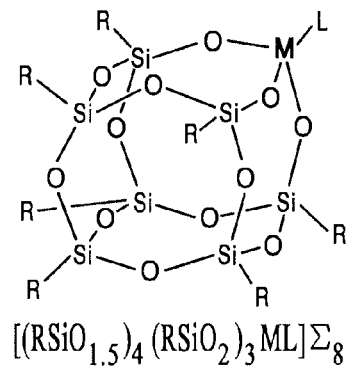
$[(RSiO_{1.5})_4 (RSiO_2)_3 ML]\Sigma_8$
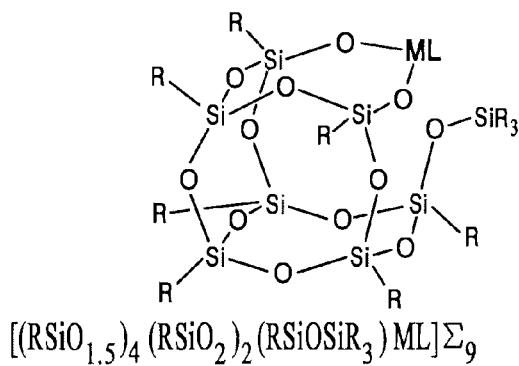
$[(RSiO_{1.5})_4 (RSiO_2)_2 (RSiOSiR_3) ML]\Sigma_9$
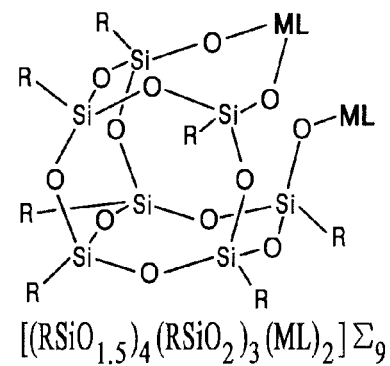
$[(RSiO_{1.5})_4 (RSiO_2)_3 (ML)_2]\Sigma_9$
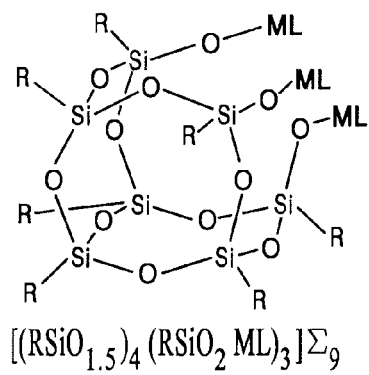
$[(RSiO_{1.5})_4 (RSiO_2 ML)_3]\Sigma_9$
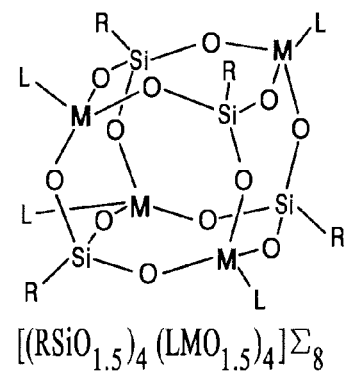
$[(RSiO_{1.5})_4 (LMO_{1.5})_4]\Sigma_8$
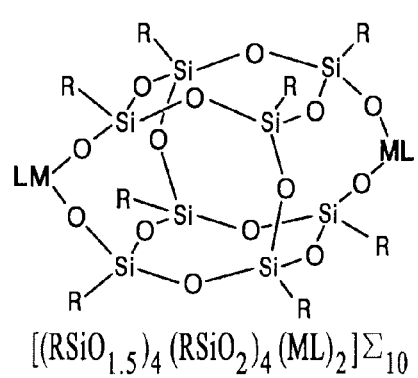
$[(RSiO_{1.5})_4 (RSiO_2)_4 (ML)_2]\Sigma_{10}$
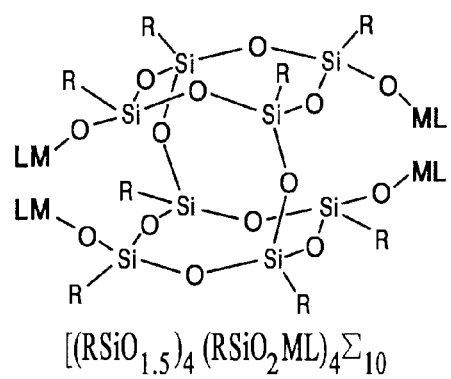
$[(RSiO_{1.5})_4 (RSiO_2 ML)_4]\Sigma_{10}$
FIG.1/1

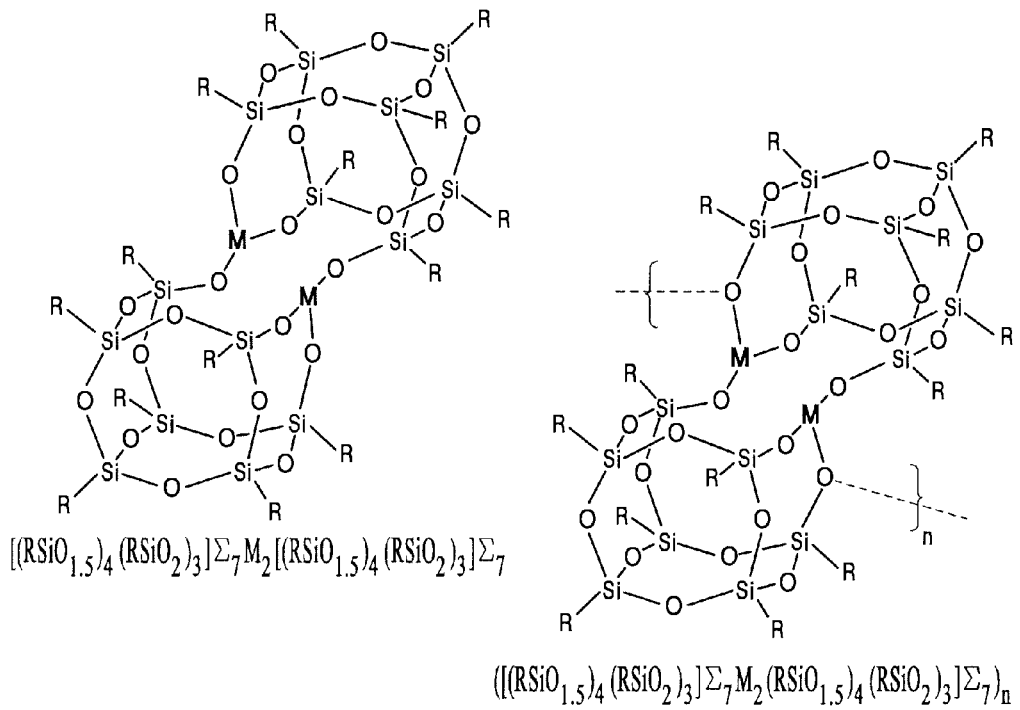
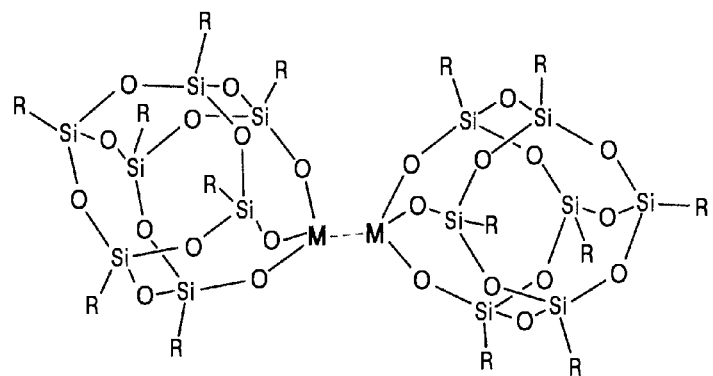
FIG.1/2

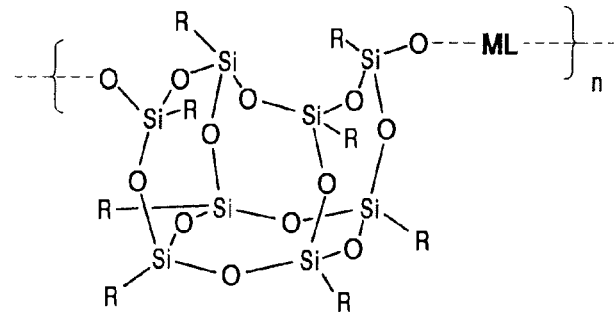
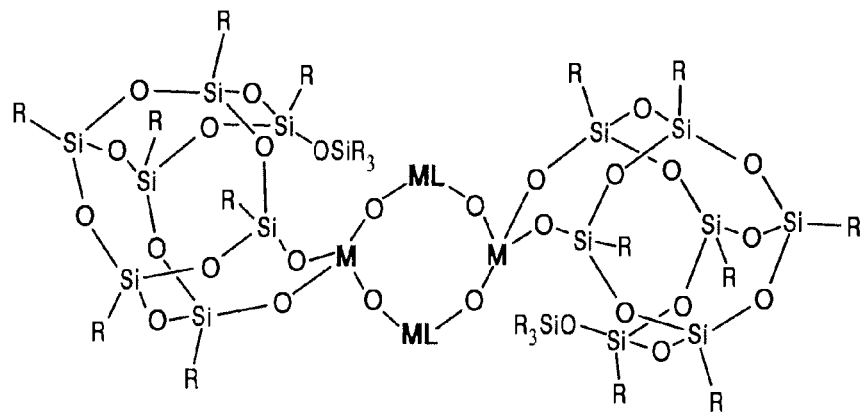
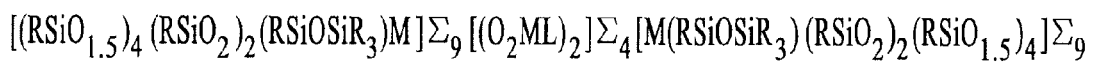
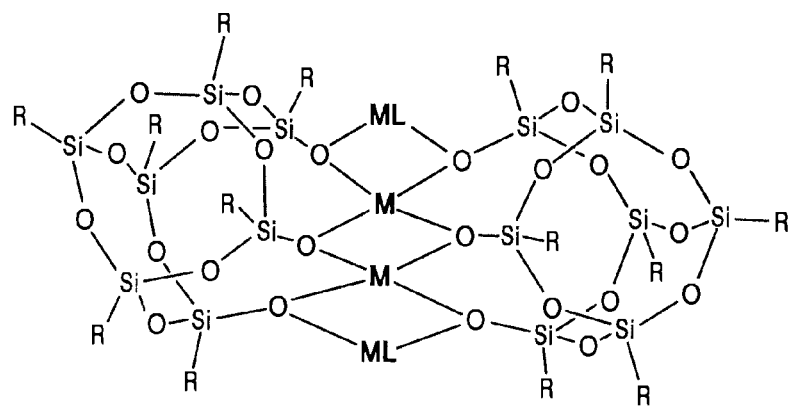
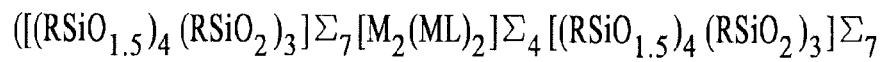
FIG.1/3

10

METALLIZED POLYHEDRAL OLIGOMERIC SILSESQUIOXANES AS CATALYSTS FOR POLYURETHANES

CROSS-REFERENCE TO RELATED APPLICATIONS

This application claims the benefit of U.S. Provisional Patent Application Ser. No. 60/931,310 filed May 21, 2007, and is a continuation-in-part of U.S. patent application Ser. No. 11/015,185 filed Dec. 17, 2004, which claims the benefit of U.S. Provisional Patent Application Ser. No. 60/531,458 filed Dec. 18, 2003.

FIELD OF INVENTION

This invention relates generally to methods for utilizing metallized nanostructured chemicals as cure promoters and catalysts to crosslink monomeric, oligomeric and polymeric mixtures into thermosetting polyurethane resins for application as paints, coatings, foams, composites and monoliths.

BACKGROUND

Metals are used to catalyze the cure (connectivity) of polyurethane chains. A polyurethane is any polymer consisting of a chain of organic units joined by urethane links. Polyurethanes are widely used in flexible and rigid foams, durable elastomers, high performance adhesives and sealants, fibers, seals, gaskets, carpet underlay, and hard plastic parts.

Polyurethanes are in the class of compounds which includes epoxies, unsaturated polyesters, and phenolics. A urethane linkage is produced by reacting an isocyanate group, —N═C═O with an hydroxyl (alcohol) group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, R—(N═C═O)$_{n≧2}$ and a polyol is a molecule with two or more hydroxyl functional groups, R'—(OH)$_{n≧2}$. The reaction product is a polymer containing the urethane linkage, —RNHCOOR'—.

Polyurethanes are produced commercially by reacting a liquid isocyanate with a liquid blend of polyols, catalyst, and any other additives. These components are referred to as a polyurethane system, or simply a system. The isocyanate is commonly referred to as the 'A-side' or just the 'iso'. The blend of polyols and other additives is commonly referred to as the 'B-side' or as the 'poly'. This mixture might also be called a 'resin' or 'resin blend'. Resin blend additives may include chain extenders, cross linkers, surfactants, fire retardants, blowing agents, pigments, and fillers.

The polymerization reaction is catalyzed by tertiary amines, such as dimethylcyclohexylamine, and organometallic salts, such as dibutyltindilaurate. Furthermore, catalysts can be chosen based on whether they favor the urethane (gel) reaction, such as diazobicyclooctane, or the urea (blow) reaction, such as bis-dimethylaminoethylether, or specifically drive the isocyanate trimerization reaction, such as potassium octoate.

Catalysis is the acceleration (increase in rate) of a chemical reaction by means of a substance, called a catalyst, that is itself not consumed by the overall reaction. More generally, one may at times call anything that accelerates a reaction, without itself being consumed or changed, a "catalyst". A promoter is an accelerator of catalysis, but not a catalyst by itself.

The most common catalyst for polyurethanes is dibutyltin dilaurate (DBTDL) which is a yellowish liquid of composition $C_{32}H_{64}O_4Sn$ MW 631.6 (bp 205°, mp 24°). DBTDL usage is no longer desirable for industrial use because it is known to give off combustible and irritating toxic fumes in a fire, and is cytotoxic and bioaccumulative. Therefore, a need exists for a catalyst that replaces DBTDL. Highly desirable are catalysts that contain more active Sn atoms in a nonflammable dissolvable solid form. Such a catalyst could be utilized in lower concentrations and would afford an overall reduction of Sn in polyurethane products.

Recent developments in nanoscience have now enabled the ability to cost effectively manufacture bulk quantities of materials that are best described as metallized nanostructured chemicals due to their specific and precise chemical formula, hybrid (inorganic-organic) chemical composition, and large physical size relative to the size of traditional chemical molecules (0.3-0.5 nm) and small size relative to larger sized traditional fillers (>50 nm) Nanostructured chemicals containing catalytically active metals behave as both fillers and catalysts to promote the connectivity of polymer chains between themselves, with fillers and surfaces, and with the nanostructured chemical.

Metallized nanostructured chemicals are best exemplified by those based on low-cost Polyhedral Oligomeric Silsesquioxanes (POSS) and Polyhedral Oligomeric Silicates (POS). FIG. 1 illustrates some representative examples of metallized nanostructured chemicals for which the all silicon containing systems are known as POSS and metallized systems are known as POMS. POMS (polyhedral oligomeric metallosesquioxanes) are cages that contain one or more metal atoms inside or outside the central cage framework. In certain instances cages may contain more than one metal atom or types of metal atoms, or even metal alloys.

Like the all silicon containing POSS cages, POMS are hybrid (i.e. organic-inorganic) compositions containing internal frameworks that are primarily comprised of inorganic silicon-oxygen bonds but which also contain one or more metal atoms bound to or inside of the cage (FIG. 2). In addition to the metal and silicon-oxygen framework, the exterior of a POMS nanostructured chemical is covered by both reactive and nonreactive organic functionalities (R), which ensure compatibility and tailorability of the nanostructure with organic polymers. Unlike metal or other particulate fillers, these metallized nanostructured chemicals have molecular diameters that can range from 0.5 nm to 5.0 nm, are of low density (>2.5 g/ml), highly dispersable into polymers and solvents, exhibit excellent inherent fire retardancy, and have unique optical and electronic properties.

SUMMARY OF THE INVENTION

The present invention describes methods of preparing catalyst and polymer compositions by incorporating metallized POSS and POS, nanostructured chemicals, most commonly referred to as POMS, into polymers. The resulting compositions are useful by themselves or in combination with other materials to form laminates or interpenetrating networks or in combination with macroscopic reinforcements such as fiber, clay, glass mineral, nonmetallized POSS cages, metal particulates, and other fillers. The resulting polymers are particularly useful in flexible and rigid foams, durable elastomers, high performance adhesives and sealants, fibers, seals, gaskets, carpet underlay, hard plastic parts, and skin and hair applications where improved hydrophobicity, surface properties, and reduced toxicity are desirable.

The preferred compositions presented herein contain two primary material combinations: (1) metallized nanostructured chemicals, metallized nanostructured oligomers, or metal containing nanostructured polymers from the chemical classes of polyhedral oligomeric silsesquioxanes, polyhedral oligomeric silicates, polyoxometallates, carboranes, boranes, and polymorphs of carbon; and (2) all components for polyurethane manufacture.

Preferably, incorporation of the metallized nanostructured chemical (POMS) into the polymers is accomplished via blending or mixing the POMS with a polymer, prepolymer or mixture of monomers or oligomers. All types, techniques, and sequences of blending, and mixing including melt blending, dry blending, solution blending, and reactive and nonreactive blending are effective.

In addition to homogeneous mixing, the selective incorporation of a nanostructured chemical into a specific region of a polymer can be accomplished by utilizing a metallized nanostructured chemical with a chemical potential (miscibility) compatible with the chemical potential of the region within the polymer. Because of their chemical nature, metallized nanostructured chemicals can be tailored to show compatibility or incompatibility with nearly all polymer systems.

BRIEF DESCRIPTION OF THE DRAWINGS

FIG. 1 illustrates metallized nanostructured chemicals based upon polyhedral oligomeric metallosilsesquioxanes (POMS).

DEFINITION OF FORMULA REPRESENTATIONS FOR NANOSTRUCTURES

Figure 2:
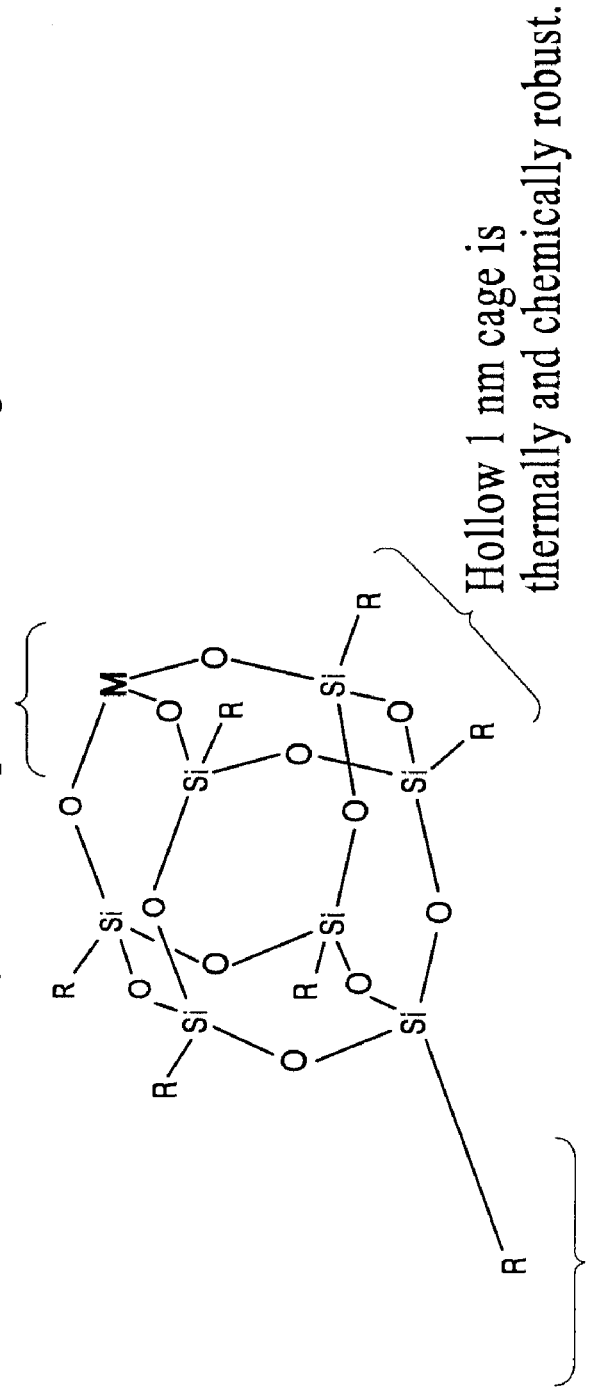
FIG. 2 shows a generic structural example of a POMS catalyst.

For the purposes of understanding this invention's chemical compositions the following definitions for formula representations of Polyhedral Oligomeric Silsesquioxane (POSS) and Polyhedral Oligomeric Silicate (POS) nanostructures are made. Polysilsesquioxanes are materials represented by the formula [RSiO$_{1.5}$]$_\infty$ where $\infty$ represents molar degree of polymerization and R=represents organic substituent (H, siloxy, cyclic or linear aliphatic or aromatic, or fluorinated groups that may additionally contain reactive functionalities such as alcohols, esters, amines, ketones, olefins, ethers or halides). Polysilsesquioxanes may be either homoleptic or heteroleptic. Homoleptic systems contain only one type of R group while heteroleptic systems contain more than one type of R group.

POSS and POS nanostructure compositions are represented by the formulas:

[(RSiO$_{1.5}$)$_n$]$_{\Sigma\#}$ for homoleptic compositions

[(RSiO$_{1.5}$)$_n$(R'SiO$_{1.5}$)$_m$]$_{\Sigma\#}$ for heteroleptic compositions (where R≠R')

[(RSiO$_{1.5}$)$_n$(RXSiO$_{1.0}$)$_m$]$_{\Sigma\#}$ for functionalized heteroleptic compositions (where R groups can be equivalent or inequivalent)

[(RSiO$_{1.5}$)$_n$(RSiO$_{1.0}$)$_m$(M)$_j$]$_{\Sigma\#}$ for heterofunctionalized heteroleptic compositions.

In all of the above R is the same as defined above and X includes but is not limited to ONa, OLi, OK, OH, Cl, Br, I, alkoxide (OR), acetate (OOCR), peroxide (OOR), amine (NR$_2$) isocyanate (NCO), and R. The symbol M refers to metallic elements within the composition that include high and low Z metals including s and p block metals, d and f block transition, lanthanide, and actinide metals. These include Al, B, Ga, Gd, Ce, W, Re, Ru, Nb, Fe, Co, Ni, Eu, Y, Zn, Mn, Os, Ir, Ta, Cd, Cu, Ag, V, As, Th, In, Ba, Ti, Sm, Sr, Pd, Pt, Pb, Lu, Cs, Tl, Te, Sn, Zr, and Hf. The symbols m, n and j refer to the stoichiometry of the composition. The symbol $\Sigma$ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that $\Sigma\#$ is not to be confused as a multiplier for determining stoichiometry, as it merely describes the overall nanostructural characteristics of the system (aka cage size).

DETAILED DESCRIPTION

The present invention teaches the use of metallized nanostructured chemicals as catalysts, cure promoters and alloying agents for polyurethanes. The keys that enable POMS to function as molecular level reinforcing agents and as cure promoters are: (1) their unique size with respect to polymer chain dimensions, (2) their ability to be compatibilized with polymer systems to overcome repulsive forces that promote incompatibility and expulsion of the nanoreinforcing agent by the polymer chains, and (3) their ability to contain and distribute catalytically active metal atoms and alloys homogeneously in polymers, oligomers, and monomers. POMS provide both catalysis function and filler-like reinforcement because of their nanoscopic nature.

Metallized nanostructured chemicals can be tailored to exhibit preferential affinity/compatibility with polymer microstructures through variation of the R groups on each cage or via association of the metal atom with functionality contained within the polymer. At the same time, metallized nanostructured chemicals can be tailored to be incompatible with microstructures within the same polymer, thus allowing for selective reinforcement of specific polymer microstructure. Therefore, the factors to effect a selective nanoreinforcement include specific cage sizes, distributions of sizes, and compatibilities and disparities between the metallized nanostructured chemical and the polymer system.

The catalytic activity and cure promotion attributes of metallized nanostructured chemicals can be controlled through the nature of the metal or number of metal atoms attached to or near the cage, the steric and electronic properties of the cage and the dispersion characteristics of the cage.

Nanostructured chemicals, such as the POMS illustrated in FIG. 1, are available as both solids and oils. Both forms dissolve in molten polymers and solvents, thus solving the long-standing dispersion problem associated with traditional particulate fillers and cure promoting agents. Moreover, because POMS dissolve in plastics at the molecular level, the forces (i.e. free energy) from solvation/mixing are sufficient to prevent cages from forming agglomerated domains as occurs with traditional and other organofunctionalized fillers. Agglomeration of particulate fillers and catalysts has been a problem that has plagued compounders, molders, and resin manufacturers.

Table 1 lists the size range of POMS relative to polymer dimensions and filler sizes. The size of POMS is roughly equivalent to that of most polymer dimensions, thus at a molecular level the cages can effectively alter the motion of polymer chains.

TABLE 1

Relative sizes of nanostructured chemicals, polymer dimensions, and fillers.

| Particle Type | Particle Diameter |
|---|---|
| Amorphous Polymer Segments | 0.5-5 nm |
| Heptacyclohexyl POMS | 1.5 nm |
| Random Polymer Coils | 5-10 nm |
| Colloidal Silica | 9-80 nm |
| Crystalline Lamellae | 1.0-9,000 nm |
| Fillers/Organoclays | 2-100,000 nm |

The ability of POSS and POMS cages to control chain motion and to promote extent of cure is particularly apparent when they are grafted onto a polymer chain. When POMS catalyze a polymerization they are not consumed, yet post-polymerization, when POMS nanostructures associate with a polymer chain, they act to retard chain motion and thereby enhance time dependent properties such as $T_g$, HDT, creep, modulus, hardness, and set, which correlate to increased modulus, hardness, and abrasion resistance and durability.

The present invention demonstrates that significant property enhancements can be realized by the incorporation of catalytically active metallized nanostructured chemicals into polyurethanes as catalysts, cure promoters and alloying agents. This greatly simplifies the prior art. In addition to flammability and toxicity issues, prior art catalysts such as DBTDL do not function as reinforcing agents nor as alloying agents within polymer morphology.

Furthermore, because metallized POSS nanostructured chemicals are single chemical entities and have discrete melting points and dissolve in solvents, monomers and plastics, they are also effective at reducing the viscosity of polymer systems. The latter is similar to what is produced through the incorporation of plasticizers into polymers, yet with the added benefit of promoting the cure of polymers and reinforcement of the individual polymer chains due to the nanoscopic nature of the chemicals. Thus, ease of processability and reinforcement effects are obtainable through the use of metallized nanostructured chemicals (e. POMS) whereas the prior art requires the use of both plasticizers and fillers or the covalent linking of POSS to the polymer chains.

EXAMPLES

General Process Variables Applicable to All Processes

As is typical with chemical processes there are a number of variables that can be used to control the purity, selectivity, rate and mechanism of any process. Variables influencing the process for the incorporation of metallized nanostructured chemicals (e.g. POMS) into plastics includes the size and polydispersity, and composition of the nanostructured chemical. Similarly, the molecular weight, polydispersity and composition of the polymer system must also be matched with that of the nanostructured chemical. Finally, the kinetics, thermodynamics, and processing aids used during the compounding process are also tools of the trade that can impact the loading level and degree of enhancement resulting from incorporation of nanostructured chemicals into polymers. Blending processes such as melt blending, dry blending and solution mixing blending are all effective at mixing and alloying metallized nanostructured chemical into plastics.

Example 1

Sn POMS Catalysts

Tin (Sn) containing POMS catalysts are easily prepared through the reaction of a dibutyl tin reagents with POSS silanols and POSS siloxides. A general example of such a synthesis is provided below as demonstration of the method. The method is not intended to be limiting.

A solution of di-n-butyltindichloride (42.8 g, 141 mmol, 1.001 eq) dissolved in THF (90 ml) was added dropwise to a solution of hepta i-butylPOSS trisilanol $[(i-BuSiO_{1.5})_4(iBu(HO)Si_{1.0})_3]_{\Sigma 7}$ (125 g, 140 mmol) and triethylamine (43.3 g, 59.6 ml, 3.05 eq) in THF (500 ml). The addition was completed after 2 hours and the reaction was stirred for 14 hours at room temperature. The mixture was filtered and volatiles removed under reduced pressure to give a solid which was dissolved into diethylether and filtered through activated charcoal and celite to produce a waxy solid in 90% yield.

A series of Sn POMS is shown in Table 2. These compositions are not intended to be limiting, rather they are provided to allow comparison of the elemental compositions, the Sn content, and the physical form of the Sn POMS relative to DBTDL. Further, it should be noted that Sn POMS compositions containing silane groups $(Si(CH_3)_2H)$ are provided to indicate the ability to incorporate a secondary reactive site on the Sn POMS for the purpose of forming an interpenetrating network, secondary reactivity site, or to mitigate leaching of the nanoscopic cage from the final composition. Alternately, this can be accomplished through the use of olefin, halide, etc., containing R groups on the POSS cage. Secondary reactive groups are desirable to improve adhesion, wettability, photocure, and biological function.

TABLE 2

Catalyst relationships between DBTDL ($C_{32}H_{64}O_4Sn$) and Sn POMS.

| Catalyst Structure | Formula | Elemental % | Physical State |
|---|---|---|---|
| 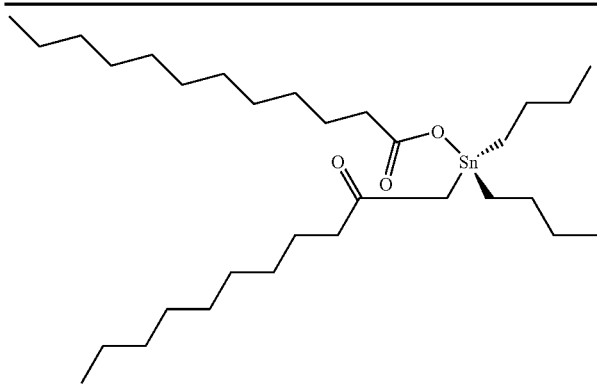 | $C_{32}H_{64}O_4Sn$ | C: 60.86, H: 10.21, O: 10.13, Sn: 18.80 | oil |

TABLE 2-continued

Catalyst relationships between DBTDL ($C_{32}H_{64}O_4Sn$) and Sn POMS.

| Catalyst Structure | Formula | Elemental % | Physical State |
|---|---|---|---|
| (structure) | $C_{64}H_{76}O_{14}Si_8Sn_2$ | C: 50.20, H: 5.00, O: 14.63, Si: 14.67, Sn: 15.50 | solid |
| (structure) | $C_{25}H_{62}O_{12}Si_8Sn$ | C: 33.43, H: 6.96, O: 21.38, Si: 25.02, Sn: 13.22 | solid |
| (structure) | $C_{24}H_{60}O_{12}Si_8Sn$ | C: 32.60, H: 6.84, O: 21.72, Si: 25.41, Sn: 13.43 | solid |
| (structure) | $C_{32}H_{90}O_{13}Si_8Sn$ | C: 37.44, H: 8.84, O: 20.26, Si: 21.89, Sn: 11.57 | Solid (mp. 52° C.) |

TABLE 2-continued

Catalyst relationships between DBTDL ($C_{32}H_{64}O_4Sn$) and Sn POMS.

| Catalyst Structure | Formula | Elemental % | Physical State |
|---|---|---|---|
| (structure with C₃H₉ groups and OSi(CH₃)₃) | $C_{32}H_{90}O_{12}Si_8Sn$ | C: 38.04, H: 8.98, O: 19.00, Si: 22.24, Sn: 11.75 | Waxy solid (mp 54° C.) |
| (structure with C₃H₉ groups and Si(CH₃)₂H) | $C_{31}H_{88}O_{12}Si_8Sn$ | C: 37.37, H: 8.90, O: 19.27, Si: 22.55, Sn: 11.91 | Waxy solid |
| (structure with C₈H₁₇ groups and OSi(CH₃)₃) | $C_{67}H_{146}O_{12}Si_8Sn$ | C: 54.11, H: 9.89, O: 12.91, Si: 15.11, Sn: 7.98 | oil |
| (structure with C₈H₁₇ groups and Si(CH₃)₂H) | $C_{66}H_{144}O_{12}Si_8Sn$ | C: 53.81, H: 9.85, O: 13.03, Si: 15.25, Sn: 8.06 | oil |

Example 2

Thermal Stability of POMS Catalysts

Figure 3:
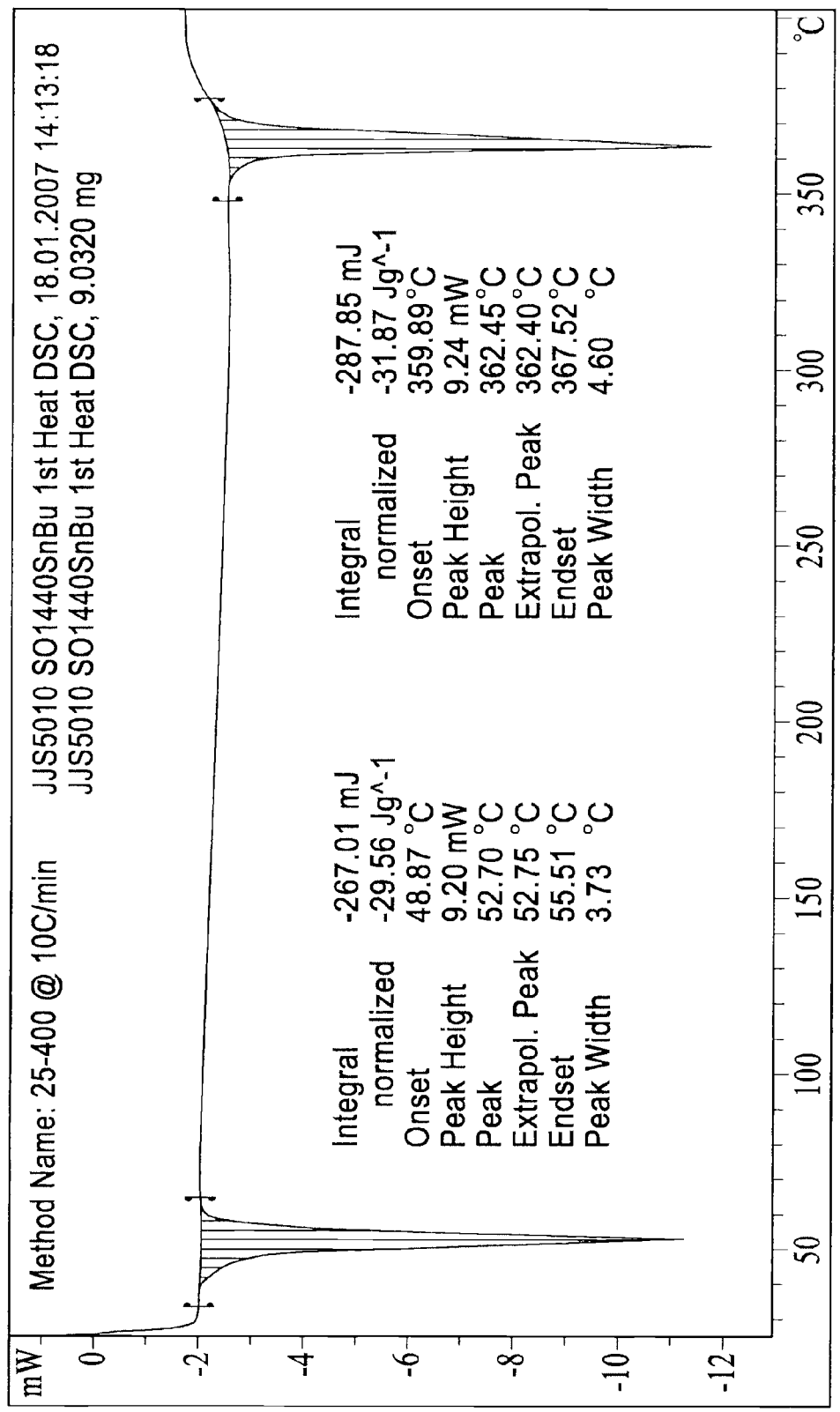
FIG. 3 is a differential scanning calorimetry plot for [(iBu-SiO$_{1.5}$)$_8$((n-butyl)$_2$Sn)]$_{\Sigma 9}$ POMS.

The thermal stability of Sn POMS was examined to determine if they could maintain catalytic cure while not undergoing decomposition. The POMS were found to be unaffected by low temperatures and exhibited thermal stabilities up to 350° C. (FIG. 3).

Example 3

Ultraviolet and Vacuum Ultraviolet Stability of POMS

Figure 4:
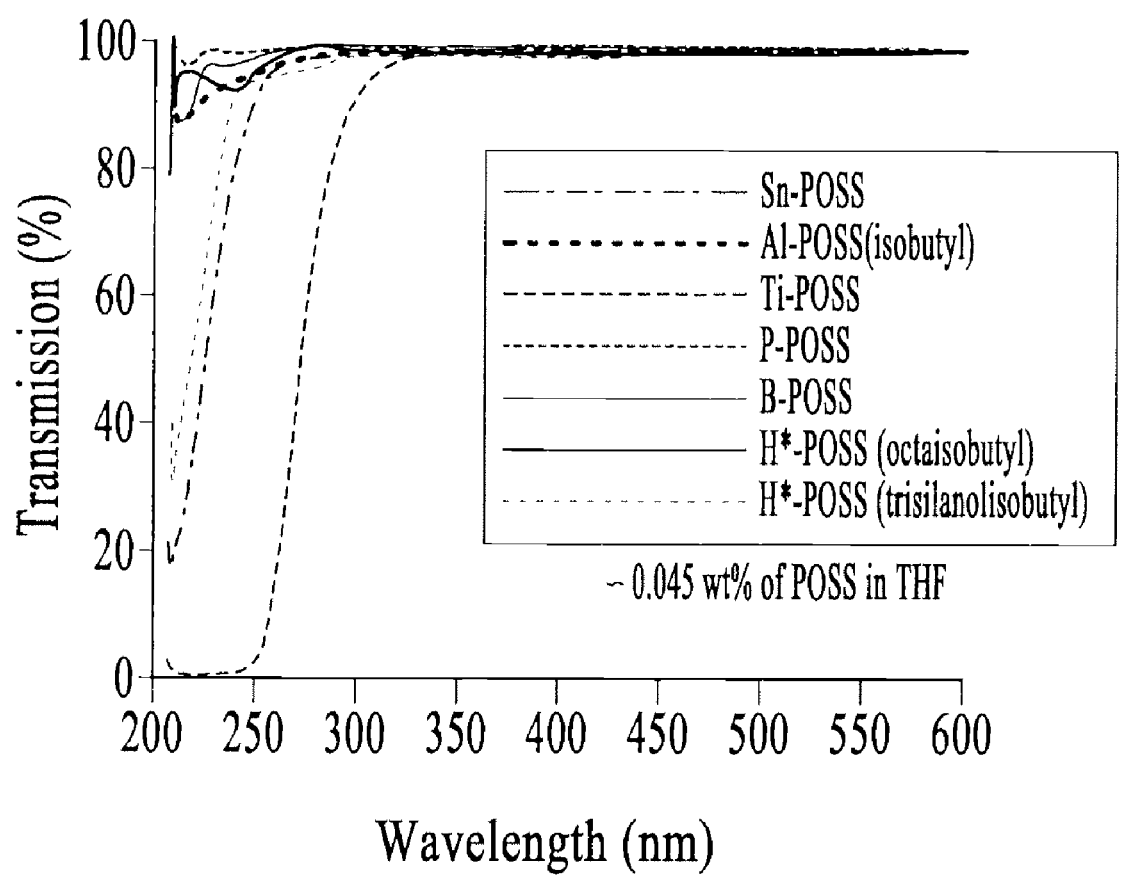
FIG. 4 shows UV-Visible plots illustrating absorption ranges of POMS.

POMS cages are additionally beneficial in polymers because of their radiation absorbing characteristics (FIG. 4). The absorption wavelength is tunable over a wide range and highly dependant upon the nature of the R group on the cage and type of metal atom. The absorptive range coupled with the high thermal stability exceeds the performance of wholly organic absorbers and provides a new opportunity for protection of high temperature polymers, composites, and coatings from UV damage. Sn POMS are specifically desirable for the absorption of radiation from 200-250 nm. Ti POMS are also effective as polyurethane catalysts and effective at radiation absorption from 200-300 nm.

Example 4

Tin POMS Catalysis of Urethane Resins

A large diversity in structures and compositions for POMS exists (see, e.g. FIG. 1). Many of these systems are capable of functioning as catalysts or co-catalysts and cure promoters in different resin systems. A preferred composition for polyurethane cure is $[(RSiO_{1.5})_8((n\text{-}butyl)_2Sn)]_{\Sigma 9}$ or $[(RSiO_{1.5})_7((n\text{-}butyl)_2SnO_{0.5})(OSiMe_3)]_{\Sigma 9}$. The activity of POMS to polyurethane cure is possible over a range of POMS loading from 0.001 wt % to 50 wt %, with a preferred loading of 0.01 wt % to 1 wt %.

For example, the addition of 1 wt % DBTDL to PPG DU1000 requires a cure time of 2 hours while the addition of 1 wt % Sn POMS $[(iBuSiO_{1.5})_8((n\text{-}butyl)_2Sn)]_{\Sigma 9}$ produces equivalent cure in 20 min. Thus, use of Sn POMS provides a 7 wt % reduction in tin usage and 83% reduction in cure time. Additional reactivity can be promoted through the synergistic use of amines with the Sn POMS catalyst. In some instances amine incorporation is desirable for use as a foaming agent and for control of reaction rate. Tertiary amines are preferred as synergists.

Organometallic tin complexes, aside from DBTDL, are rarely considered as viable alternatives to existing polyurethane catalyst systems. The main reason is the poor hydrolytic stability of organo-tin complexes and their toxicity. All of the Sn POMS exhibited excellent hydrolytic stability and compatibility with polyurethane components because the bulky, hydrophobic R groups on the cage effectively provide hydrophobicity to the metal atom while maintaining a high level of catalytic activity. Additionally, the R groups on the cage provide for solubilization of the POMS into the resin components. For aliphatic resin systems, aliphatic R groups on POMS are preferred while for aromatic resins, aromatic groups on POMS are preferred.

Example 5

Titanium and Aluminum POMS Catalysis of Urethane Resins

In addition to tin, POMS containing titanium (Ti) and aluminum (Al) are also effective at catalysis of urethane resins. In general Ti POMS are prone to coloration of the polyurethane. The coloration can be mitigated through the addition of small amounts of organoperoxide which maintains the oxidized and colorless state for Ti.

Similarly Al POMS can be effective as polyurethane catalysts. The Al POMS $[(RSiO_{1.5})_7(AlO_{1.5})]\Sigma_8$ exists as a dimer in the solid-state and must be activated as a monomer in order to catalyze reactions. This is accomplished through heat and through incorporation of amine synergists. Again tertiary amines are preferred as co-catalysts.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method of polyurethane polymerization comprising compounding a catalytically active material including a polyhedral oligomeric metallasilsesquioxane (POMS) into a polyurethane system.

2. The method of claim 1, wherein a material selected from the group consisting of nonmetallized POSS and nonmetallized POMS is compounded into the polyurethane system.

3. The method of claim 1, wherein the POMS reinforces the polyurethane at a molecular level.

4. The method of claim 1, wherein the compounding is nonreactive.

5. The method of claim 1, wherein the compounding is reactive.

6. The method of claim 1, wherein the compounding is accomplished by blending the POMS into the polyurethane system.

7. The method of claim 6, wherein the blending process is selected from the group consisting of melt blending, dry blending, and solution blending.

8. The method of claim 1 wherein the POMS functions as a plasticizer.

9. The method of claim 1, wherein the POMS functions as a filler.

10. The method of claim 1, wherein the POMS is selectively compounded into a predetermined region within the polymerized polyurethane system.

11. The method of claim 1, wherein the POMS controls molecular motion of the polyurethane.

12. The method of claim 1, wherein the POMS cross-links the polyurethane.

13. The method of claim 1 wherein the POMS is selected to have chemical properties compatible with a selected region of the polyurethane.

14. A composition comprising a polymerized polyurethane system including a polyhedral oligomeric metallasilsesquioxane (POMS).

* * * * *